Nov. 29, 1960  E. S. TUPPER  2,961,850
INDIVIDUALIZED ICE MOLD
Filed Oct. 28, 1954  2 Sheets-Sheet 1
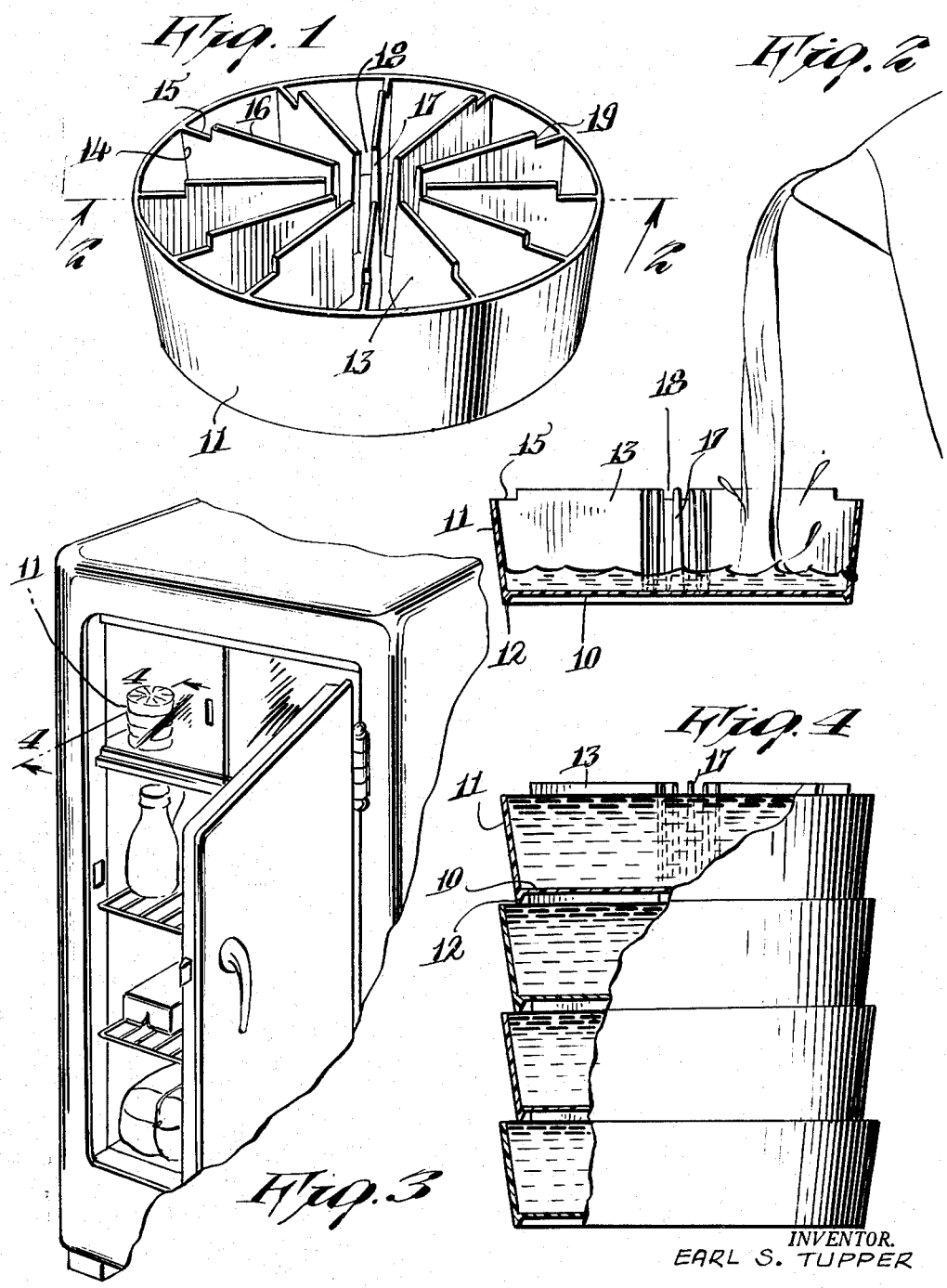
INVENTOR.
EARL S. TUPPER
BY Nov. 29, 1960 E. S. TUPPER 2,961,850
INDIVIDUALIZED ICE MOLD
Filed Oct. 28, 1954 2 Sheets-Sheet 2
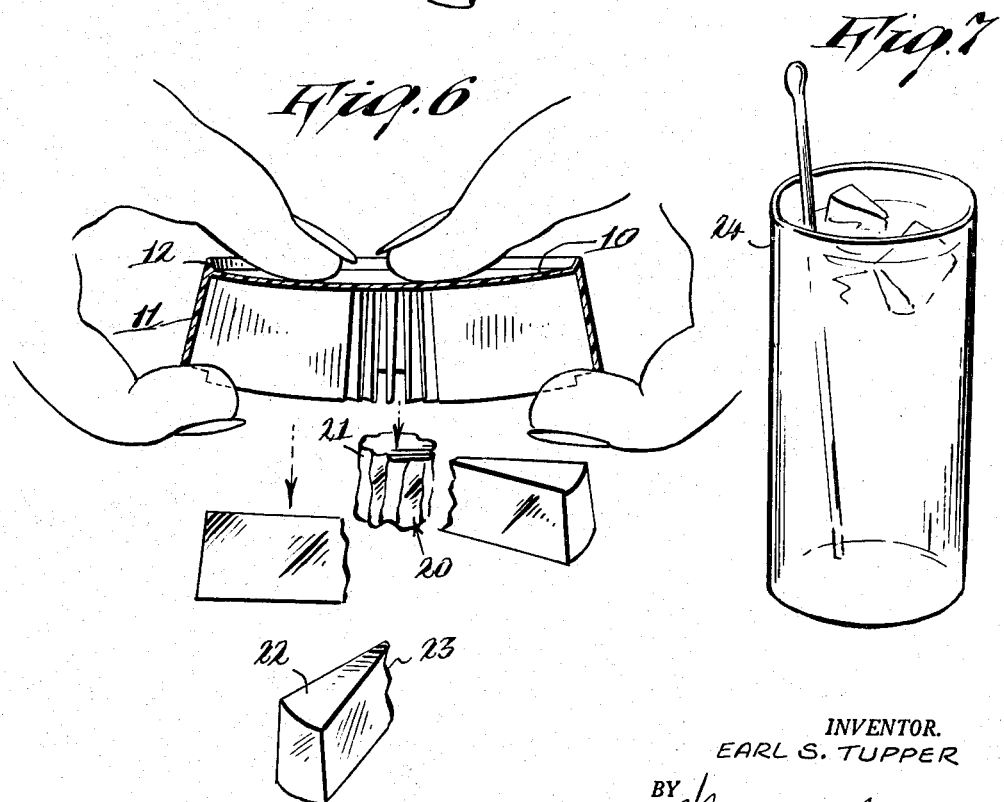
INVENTOR.
EARL S. TUPPER United States Patent Office 2,961,850
Patented Nov. 29, 1960

2,961,850
INDIVIDUALIZED ICE MOLD

Earl S. Tupper, Farnumsville, Mass., assignor to Tupper Corporation, North Smithfield, R.I., a corporation of Delaware Filed Oct. 28, 1954, Ser. No. 465,210

5 Claims. (Cl. 62—370)

The invention relates generally to ice molds, but more specifically to an ice mold having comparable capacity to the individual cell of the conventional multiple type molds.

The main object of the invention is to provide an individualized ice mold capable of freezing a volume of water or other freezable fluid sufficient to cool a tumbler of beverage, water, or other fluid and further capable of being distorted for purposes of loosening and ejecting the iced contents after the individualized ice mold is removed from the refrigerator in the form of a plurality of small pieces whereby the pieces may serve as crushed ice.

A further object of the invention is to provide an individualized ice mold capable of being frozen individually for a single drink and which eliminates the handling and refrigerating of a large multi-celled ice-cube mold.

One difficulty in the past with multicelled ice-cube molds has been that for a required cooling of a tumbler of fluid, it has been necessary to fill, remove the multicelled mold and thereafter loosen all the cells in order to pluck out an ice-cube. By the present invention each of the individualized ice molds after filling with fluid is capable of independent freezing in the refrigerator and the molds themselves are capable of being stacked one on top of another without sticking so that for purposes of removal each ice mold is independently withdrawn.

A further object of the invention resides in the provision of an individualized ice mold having a specific construction whereby on application of finger pressure between the bottom and side walls and simultaneous rotation, the frozen contents are capable of easy ejection in the form of fragments into a beverage tumbler furnishing thereby a predetermined quantity of effectual crushed ice or other fluid in frozen condition.

A further feature of the invention resides in the provision of an individualized ice mold which is capable of functioning for proper delivery of fragmented frozen particles by reason of local deformability of the material from which the ice mold is made and by reason of the inherent physical and chemical characteristics thereof. Such material is polyethylene or any other plastic material which has similar physical characteristics such as the vinyls and derivatives thereof.

Another feature of the invention resides in the provision of an individualized ice mold which is capable of being stacked vertically as well as disposed horizontally for conservation of space within a refrigerator, which is capable of being used with the least amount of bother in filling and storing in and removing from the refrigerator which is economical to manufacture, which is of sterile material and which is durable and efficient in use and operation.

These objects and other incidental ends and advantages of the invention will hereinafter appear in the progress of the disclosure and as pointed out in the appended claims.

Accompanying this specification are drawings showing a preferred form of the invention wherein:

Figure 1 is a view in perspective of the individualized ice mold, the subject of the invention herein.

Figure 2 is a sectional view of Figure 1 across the plane 2—2 showing the manner of filling the mold with water or other fluid preliminary to introduction into the deep freeze of a refrigerator or other device.

Figure 3 is a partial view in perspective showing the individualized ice molds in the deep freeze compartment in vertically stacked disposition.

Figure 4 is an enlarged sectional view of the stacked and individualized ice molds shown in Figure 3 illustrating the maner of positioning and the functionality of the parts.

Figure 5 is a view in perspective showing the manner in which the frozen contents of the individualized ice mold are loosened for ejection in the form of fragments.

Figure 6 is a sectional view of Figure 5 across the plane 6—6.

Figure 7 is a view in perspective showing a tumbler of fluid or beverage with ice fragments coming from an individualized freezing mold.

In accordance with the invention and the preferred form shown, numeral 10 indicates a bottom wall of the mold, and as shown is circular in shape, said wall having a frusto-conical continuous side wall 11 connected thereto. A peripheral bead 12 extends from the lower edge of side wall 11 to below the bottom wall 10 for purposes of enabling the vertical stacking of a plurality of such molds as will hereinafter appear.

A plurality of spaced and radially disposed fins each designated by numeral 13 are vertically disposed and integrated with the bottom wall 10, the outer edges 14 each integrally joining the inner surface of side wall 11 along the height thereof at a reduced upper edge portion. Each of the fins 13 is preferably tapered from the base so that the upper parts are more yieldable while the edge portion inwardly of reduced edge portion 15 and designated by numeral 16 projects above the top edge of side wall 11 to enable vertical stacking of the molds as will hereinafter appear.

The forward or inner free edge 17 of each of the fins 13 terminates concentrically and outwardly of the center of bottom wall 10 to form a cylindrical mold portion having narrow openings 18 between adjacent edges 17, said openings serving as breaking points between the frozen fluid between each of the wedge-shaped compartments between adjacent fins 13 and the cylindrical core inside of fin edges 17.

For stacking purposes, shoulders 19 formed betwen the fin upper edge portions 15 and 16 serve to prevent the horizontal displacement of superposing molds by the engagement of peripheral bead 12 therewith, the outer face of bottom wall 10 of the superposing mold resting on the fin upper edge portions 16.

It is to be noted that the level of the water or the liquid in the individualized ice mold is controlled by the height of side wall 11 since fluid overflows at this point. Moreover, the upper edge portion of each fin indicated by numeral 16 serves to support the bottom 10 of each of the adjacent individualized ice molds inside of the peripheral bead 12 thereby spacing the molds above the water level to prevent adherence during the freezing process.

As shown in Figure 6 and after freezing, the mold is turned upside down and pressure is exerted between the thumbs of the fingers on the central portion of the bottom side of bottom wall 10 while at the same time pressure by the other fingers of the hand at diagonal points is applied in an outward direction to the edges of the side wall adjacent fin edge portions 15. The operation is repeated successively as the mold is rotated. In this way, local distortion of the mold takes place causing a separation of the frozen contents between the inner side of side wall 11, the inner sides of adjacent fins 13, and the upper side of bottom wall 10. Breakage takes place at each of spacings 18 leaving a frozen core 20 having broken edges 21 and a plurality of wedge shaped fragments 22 for ejection as shown in Figure 6. The front broken edges of fragments 22 from the central core are indicated each by numeral 23.

The upper portions of the fins 13 are adapted to flex about the bottom and outer end edges integrated with bottom and side walls 10 and 11, such flexing being augmented by virtue of the thinning out of each of the fins toward the top. This flexing is made feasible by the inherent characteristics of the material as above mentioned from which the mold is made, namely, polyethylene or other plastic and material having similar physical characteristics and including the vinyls and derivatives thereof. In the ejection of fragments, the mold is loosened from the frozen contents by the procedure aforementioned, namely downward pressure by the thumbs on the underside of bottom wall 10 and outward pressure by the other fingers on the side wall 11, said operations being repeated during rotation of the device whereby the full complement of the fluid capacity of the mold is broken into fragments and ejected into a container 24.

In the production of the mold, any of the conventional methods of molding may be resorted to.

Thus, the invention satisfies one of the great needs in the production of individualized ice molds capable of individual dispensing by the consumer into his or her own beverage container 24 of the fragmented contents of an ice mold. This method is convenient, sanitary and quantitatively selected since not all of the fragments from the mold need be used.

The shape of the mold may be varied so long as there are no under-cuts to prevent the ejection of each of the fragments and to permit the breaking off of the fragments from the central core.

I wish it understood that minor changes and variations in the material, integration, size and location of parts may all be resorted to without departing from the spirit of the invention and the scope of the appended claims. Moreover, the mold may be used to freeze liquid foodstuffs and other non-edible fluids for fragmentation.

I claim:

1. Stackable and individualized molds for freezing fluids, each comprising a body member having a bottom and peripheral side wall, a peripheral bead extending below said bottom wall, a plurality of partitions forming intercommunicating chambers within the body member for the receipt of a fluid to be frozen, each of said partitions having inner and elevated top edge portions above the side wall to support the bottom wall of a superposing individualized mold and having outer and reduced top edge portions coplanar with the top edge of said side wall to engage the peripheral bead of the said superposing individualized mold, each of the said molds and parts being formed of locally deformable material for disengaging, cleaving, and ejecting the contents of each of the molds between the partitions by finger pressure and tension in the form of individual pieces after freezing of the contents.

2. Stackable and individualized molds as set forth in claim 1 wherein each of said molds and parts are formed of polyethylene or other material having similar physical characteristics.

3. Stackable and individualized molds for freezing fluids each comprising a body member having a bottom and a frusto-conically shaped peripheral side wall, a peripheral bead extending below said bottom wall, a plurality of radially disposed and spaced partitions between the bottom and side walls and terminating inwardly and concentrically of the bottom wall to form intercommunicating chambers for the receipt of fluid to be frozen, each of said partitions having inner and elevated top edge portions above the side wall to support the bottom wall of a superposing individualized mold and having outer and reduced top edge portions coplanar with the top edge of said side wall to engage the peripheral bead of said superposing individualized mold, each of the said molds and parts being formed of a locally deformable material for disengaging, cleaving, and ejecting the contents of each of the molds between the partitions and wall by finger pressure and tension as individual pieces after freezing of the contents.

4. Stackable and individualized molds as set forth in claim 3 wherein each of said molds and parts are formed of polyethylene or other material having similar physical characteristics.

5. An individualized ice mold comprising a body member having a bottom and a relatively shallow peripheral side wall, spaced radial fins extending from said side and bottom walls and each terminating closely adjacent but outwardly of the radial center of the body member to permit the formation of a central and concentric core of ice having a diameter in excess of the spacing between the inner ends of adjacent pairs of said fins, the body diameter, height of said side wall and dimensions of the radial fins being proportioned to permit formation both of said central core of ice and sectorial pieces of ice joined thereto, each of said pieces being between a pair of adjacent radial fins, each of the sectorial pieces of ice being individually breakable from the central core and otherwise ejectable intact by finger pressure on said body member, said mold and said parts being formed of a resilient and locally deformable plastic.

References Cited in the file of this patent
UNITED STATES PATENTS

| | | |
|---|---|---|
| 1,600,055 | Meyer | Sept. 14, 1926 |
| 1,868,773 | Staake | July 26, 1932 |
| 2,067,064 | Chilton | Jan. 5, 1937 |
| 2,433,211 | Gits | Dec. 23, 1947 |
| 2,471,801 | Wallace | May 31, 1949 |
| 2,474,936 | Elliott | July 5, 1949 |
| 2,587,233 | Schweller | Feb. 26, 1952 |
| 2,674,862 | Nigro | Apr. 13, 1954 |
| 2,720,760 | Nigro | Oct. 18, 1955 |
| 2,726,517 | Pruett | Dec. 13, 1955 |